United States Patent [19]

Horowitz et al.

[11] 4,129,525
[45] Dec. 12, 1978

[54] METHOD OF MAKING LEAD-RICH AND BISMUTH-RICH PYROCHLORE COMPOUNDS USING AN ALKALINE MEDIUM

[75] Inventors: Harold S. Horowitz, Clark; John M. Longo, New Providence; Joseph T. Lewandowski, Middlesex, all of N.J.

[73] Assignee: Exxon Research & Engineering Co., Florham Park, N.J.

[21] Appl. No.: 856,648

[22] Filed: Dec. 2, 1977

[51] Int. Cl.$^2$ .................................... C01G 55/00
[52] U.S. Cl. ............................ 252/518; 252/425.3; 423/593; 429/40
[58] Field of Search ........... 423/593; 252/63.5, 425.3, 252/518; 429/40, 44, 45

[56] References Cited

U.S. PATENT DOCUMENTS

| | | | |
|---|---|---|---|
| 3,553,109 | 1/1971 | Hoffman et al. | 423/593 |
| 3,682,840 | 8/1972 | Van Loan | 252/518 |
| 3,769,382 | 10/1973 | Kuo et al. | 264/61 |
| 3,896,055 | 7/1975 | Bouchard et al. | 423/593 |
| 3,951,672 | 4/1976 | Langley et al. | 106/53 |

OTHER PUBLICATIONS

Trehonx et al., "C. R. Acad. Sc. Paris", vol. 281, Sep. 15, 1975, Series C-379.
Morgenstern-Badarau et al., "C. R. Acad. Sc. Paris", Nov. 23, 1970, pp. 1313–1316.
Morgenstern-Badarau et al., "Ann. Chim.", vol. 6, 1971, pp. 109–124.
Longo et al., "Materials Res. Bull.," vol. 4, 1969, pp. 191–202.
Sleight, "Materials Res. Bull.," vol. 6, 1971, pp. 775+.
Bouchard et al., "Materials Res. Bull.," vol. 6, 1971, pp. 669–680.
Trehoux et al., "J. of Solid State Chem.," vol. 21, 1977, pp. 203–209.

*Primary Examiner*—Herbert T. Carter
*Attorney, Agent, or Firm*—Kenneth P. Glynn

[57] ABSTRACT

A liquid solution method of preparing electrically conductive pyrochlore compounds of high surface area, having the formula:

$$A_2[B_{2-x}A_x]O_{7-y}$$

is disclosed wherein A is selected from lead, bismuth and mixtures thereof, B is selected from ruthenium, iridium and mixtures thereof, $0 < x \leq 1.0$ and $0 \leq y \leq 1$. The method involves reacting A and B cations to yield a pyrochlore oxide by precipitation of A and B cations from an aqueous solution source of these cations in a liquid alkaline medium having a pH of at least about 13.5 in the presence of an oxygen source at a temperature below about 200° C for a sufficient time for reaction to occur.

21 Claims, 8 Drawing Figures

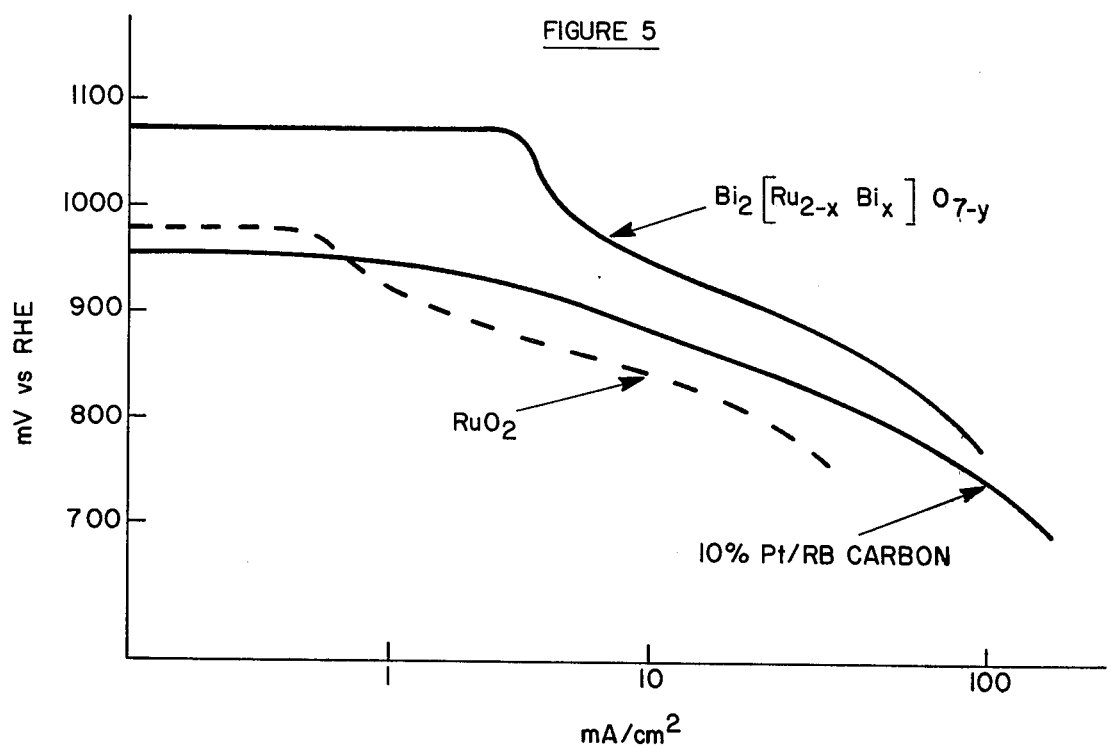
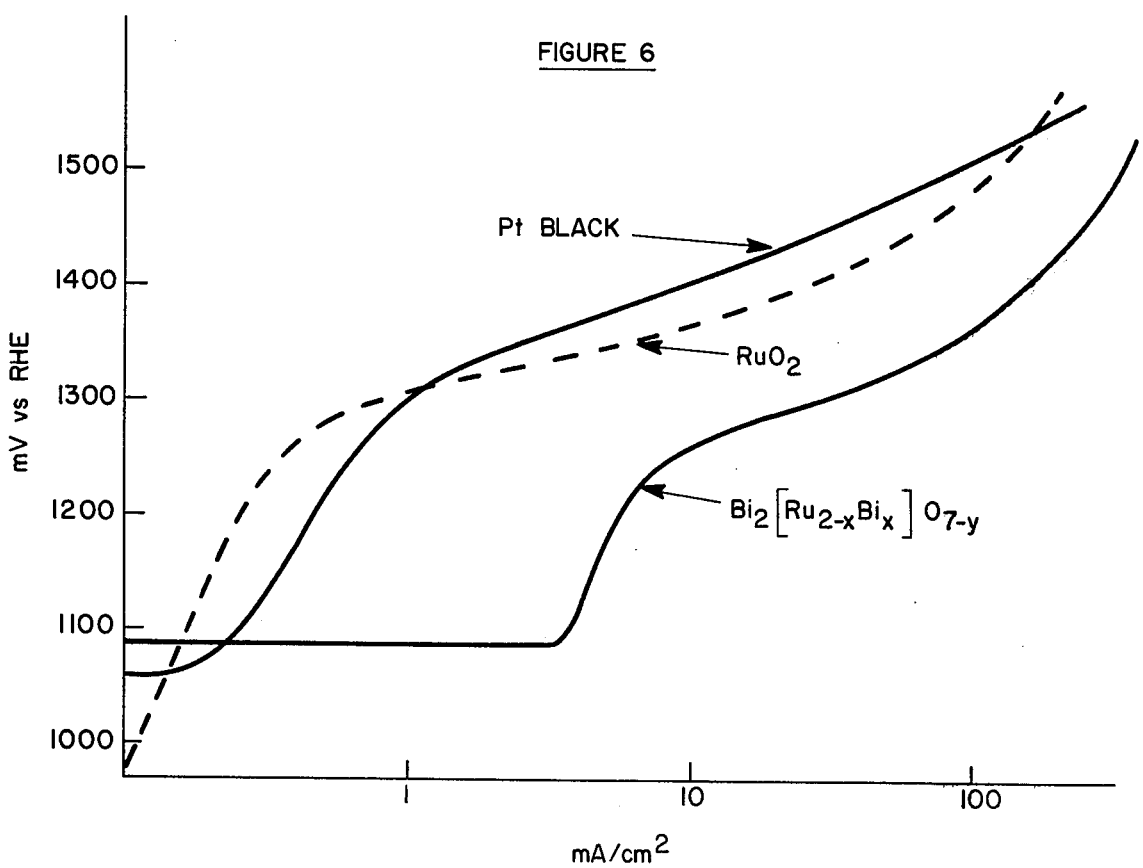

METHOD OF MAKING LEAD-RICH AND BISMUTH-RICH PYROCHLORE COMPOUNDS USING AN ALKALINE MEDIUM

BACKGROUND OF THE INVENTION AND PRIOR ART STATEMENT

The present invention is directed to a method of preparation of pyrochlore structure compounds. More particularly, the present invention is directed to a method of preparing lead-rich and bismuth-rich ruthenate and iridate pyrochlores. These pyrochlores have many uses including use as oxygen electrodes in electrochemical devices.

A number of various types of electrochemical devices have been developed over the past few years for the production of electrical energy by electrochmeical reaction and obversely for the consumption of electrical energy to effectuate electrochemical reactions. Many of these devices rely upon a reaction involving oxygen (or air) as part of the mechanism to accomplish the desired result. For example, such devices may contain oxygen electrodes which are oxygen reducing cathodes in which oxygen is catalytically electroreduced. Alternatively, such devices may contain oxygen electrodes at which catalyze the evolution of oxygen from water. In general, these electrodes are known in the art as oxygen electrodes. Thus, metal-oxygen batteries, metal-air batteries, fuel cells, electrolyzers, metal electrowinning devices, etc., are among the well-known electrochemical devices which may contain oxygen electrodes. Typically, such devices contain electrocatalyst materials at one or more of their electrodes and precious metals, such as platinum (on carbon suppport) and silver (on carbon and other supports), are frequently employed as electrocatalysts.

In addition, various electrocatalytic alloys, compounds and compound mixtures have been developed for these electrochemical devices to achieve more desirable systems. For example, U.S. Pat. No. 3,536,533 (Kitamura) describes the use of an alloy of gold, silver, palladium and at least one of platinum, rhodium and ruthenium as a fuel cell electrode electrocatalyst, and U.S. Pat. No. 3,305,402 (Jones et al.) describes the use of a combination of platinum and ruthenium oxides as an electrocatalyst. However, both references describe these catalysts as fuel cell anode (or fuel oxidation) catalysts. O'Grady et al., Technical Report No. 37, "Ruthenium Oxide Catalysts For The Oxygen Electrode", Contract No., N0014-67-A-0404-0006 (AD-779-899) Office of Naval Research, May 1974 (National Technical Information Service) describes the use of ruthenium oxide as an electrochemical catalyst for both the generation of oxygen and the reduction of oxygen. U.S. Pat. No. 3,405,010 (Kordesch et al.) teaches that spinel type electrode catalysts have been found to produce better activation of the electrode and improved electrolyte repellency of the electrode by the inclusion of ruthenium.

The foregoing prior art describes various types of electrodes including those which utilize iridium and/or ruthenium-containing catalysts. However, none of these references teaches or renders obvious the bismuth-rich and lead-rich pyrochlore compounds described herein, much less their particular method of preparation as claimed herein.

Heretofore, many pyrochlore compounds such as the pyrochlore compounds $Pb_2Ru_2O_{7-y}$ (lattice parameter of 10.253Å), $Pb_2Ir_2O_{7-y}$ (lattice parameter of 10.271Å), $Bi_2Ir_2O_{7-y}$, $Bi_2Rh_2O_{7-y}$, $Pb_2Rh_2O_{7-y}$, $Pb_2Pt_2O_{7-y}$ and $Cd_2Re_2O_{7-y}$, commonly referred to as lead ruthenate, lead iridate, bismuth iridate, bismuth rhodate, lead rhodate, lead platinate and cadmium rhenate, respectively, and similar compounds, have been known. For example, Longo, Raccah and Goodenough, Mat. Res. Bull., Vol. 4, pp. 191–202 (1969), have described the compounds $Pb_2Ru_2O_{7-y}$ and $Pb_2Ir_2O_{7-y}$ and their preparation at elevated temperatures which are in excess of 700° C. Sleight, Mat. Res. Bull., Vol. 6, p. 775 (1971) has also described the compounds $Pb_2Ru_2O_{7-y}$ and $Pb_2Ir_2O_{7-y}$ (including the pyrochlore compound $Pb_2Ru_2O_{6.5}$ having a lattice parameter of 10.271Å) and their preparation at 700° C. and 3000 atmospheres of pressure. U.S. Pat. No. 3,682,840 (Van Loan) describes the preparation of lead ruthenate at temperatures of 800° C. and higher. These references do not teach that lead-rich or bismuth-rich compounds made by the present invention exist or that they may be prepared in an alkaline medium at temperatures below about 200° C. as claimed herein.

U.S. Pat. Nos. 3,769,382 (Kuo et al.) and 3,951,672 (Langley et al.) both disclose the preparation of lead ruthenate and lead iridate using various techniques at temperatures of at least about 600° C., and preferably at higher temperatures. However, these references fail to recognize that the lead-rich pyrochlores used in the present invention are obtained at generally lower temperatures or that such pyrochlores have improved physical properties. Further, these references also fail to teach or render obvious the method of preparation of lead-rich and bismuth-rich pyrochlore compounds of the present invention.

Bouchard and Gillson, Mat. Res. Bull., Vol. 6, pp. 669–680 (1971) describe $Bi_2Ru_2O_7$ and $Bi_2Ir_2O_7$ preparation and properties, including the fact that these compounds have high conductivity and small Seebeck coefficients. However, there is no teaching that these compounds are useful electrocatalysts in electrochemical devices. Derwent's Basic Abstract Journal, Section E, Chemdoc, Week No. Y25, Abstract No. 320 (Aug. 17, 1977), Derwent Accession No. 44866Y/25 describes electrodes for electrolysis of alkaline and carbonate solutions which comprise nickel-plated steel strips coated with high conductivity layers containing $Cd_2Re_2O_7$, $Pb_2Re_2O_{7-y}$ or $Ni_2Re_2O_7$. These compounds are prepared by impregnating perrhenic acid and a metal nitrate such as Cd nitrate onto a nickel strip and baking at 350° C. However, these compounds are all rhenates rather than ruthenates or iridates and are not taught to be lead-rich or bismuth-rich compounds prepared by the method of the present invention. National Bureau of Standards, Washington, D.C., Institute for Mat. Research, Abstract of Rept. No. NBSIR-75-742 (1974) describes the use of mixed oxides as oxygen-reducing electrocatalysts in acid fuel cells, including the use of barium ruthenate. However, of all materials suggested for such electrocatalysts, none are of the pyrochlore type structure compounds made by the method of the present invention.

It is seen that the above prior art dealing with the synthesis of the electrically conductive pyrochlore structure oxides have all taught synthesis temperatures at least as high as 600° C. These highly elevated temperatures have been employed because they have been considered necessary to overcome the diffusional limitations encountered in solid state reactions. These highly elevated temperatures, however, result in the formation of sintered products with low surface areas. This is a disadvantageous condition for materials used in catalytic and electrocatalytic applications since the concentration of available catalytically active sites is limited.

It would be desirable from both an energy conservation standpoint and a maximization of surface area standpoint to carry out these materials syntheses at significantly lower temperatures, e.g. below 300° C., but the kinetics of solid state reactions are unfavorably sluggish. Solution syntheses offer one possible approach to achieving these very low temperature reactions. For example Trehoux, Abraham and Thomas, *Journal of Solid State Chemistry*, Vol. 21, pp. 203–209 (1977) and *C. R. Acad. Sc. Paris*, t, 281 pp. 379–380 (1975) describe the solution preparation of a pyrochlore compound of the formula

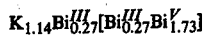

$[O_{4.9}OH_{1.1}]OH_{0.8}$. The synthesis is carried out by adding a bismuth nitrate solution to a solution of 17% potassium hydroxide containing an excess of potassium hypochlorite. The reaction is carried out in this medium for 2 hours in a reflux type of apparatus at a temperature slightly higher than 100° C. The method of synthesis and the product prepared are different in many respects from the synthesis method and products herein. The compound prepared in the cited reference is not an oxide but rather an oxyhydroxide which has a significant amount of protons incorporated into the bulk structure. Proton nuclear magnetic resonance experiments on the materials of the present invention show that they are oxides which do not have significant amounts of protons incorporated into the structure. The pyrochlore synthesized by Trehoux et al. is not a ruthenium or iridium containing compound and, in fact, is believed not to be an electrically conductive pyrochlore. The potassium hydroxide solution used in the Trehoux reference serves not only as a reaction medium but also as a constituent in the reaction since potassium is incorporated into the A site of the pyrochlore. In the method of the present invention the alkali solution employed is solely a reaction medium with no measurable amount of alkali metal cations incorporated in the pyrochlore compound which results from the synthesis.

Morgenstern-Badarau and Michel, *Ann. Chim.*, Vol. 6, pp. 109 et seq. (especially at 109–113) (1971), and *C. R. Acad. Sc. Paris*, Vol. 271, Seire C pp. 1313–1316 (1970) report the solution preparation of pyrochlore compounds having the formula $Pb_2Sn_2O_6.xH_2O$ where $0<x<1$. The conditions of preparation are strictly defined as follows: equimolar quantities of lead and tin are reacted from solution in the presence of the complexing agent nitrilo-triacetic acid (NITA) such that the concentration of $[NITA]/[Pb^{2+}] = 2$. The pH of the reaction medium is fixed at 11 and the reaction is carried out for several hours at 80° C. The compound prepared by Morgenstern-Badarau et al. is a hydrated oxide whereas materials made by the method of the present invention are oxides. The pyrochlore prepared in this reference, while it does contain lead, is not a lead-rich pyrochlore in any way similar to the materials prepared by the method of the present invention. In fact the pyrochlore prepared by Morgenstern-Badarau and Michel is not a ruthenium or iridium containing pyrochlore and is believed not to be electrically conductive. Morgenstern-Badarau et al. also specifically state that their preparation method is one which gives a solid product containing $Pb^{2+}$. The method of the present invention is such that the solid product contains a mixture of $Pb^{2+}$ and $Pb^{4+}$. While the presence of a complexing agent is required in the synthesis described in the cited reference, no such complexing agent is required in the method of preparation of the present invention. Furthermore, the specified range of pH of the synthesis medium in the method of the present invention clearly differs from the range of pH within which the method of the cited reference will operate. In fact the Morgenstern-Badarau and Michel, *Ann. Chim.*, Vol. 6, pp. 109–124 (1971) reference clearly states that no solid product compound can be obtained if conditions which are coincident with those specified for the present invention (pH > 13.5, temperature = 80° C., zero concentration of complexing agent) are employed.

In summary, there exists a formidable body of prior art describing the existence of various pyrochlores, their potential uses including uses as dielectric materials, and describing various metals and metal oxides as electrocatalyst materials. Notwithstanding such prior art, there is no suggestion or teaching that (a) the lead-rich or bismuth-rich pyrochlore compounds made by the method of the present invention even exist, or that (b) the method of the present invention may be used to make such compounds.

DESCRIPTION OF THE PRESENT INVENTION

The present invention is directed to a method of preparing compounds having the formula:

$$A_2[B_{2-x}A_x]O_{7-y} \qquad (1)$$

wherein A is selected from the group consisting of lead, bismuth and mixtures thereof, B is selected from the group consisting of ruthenium, iridium and mixtures thereof, and wherein x is a value such that $0<x\leq 1.0$ and y is a value such that $0\leq y\leq 1$.

The compounds made by the method of the present invention, as represented by formula (1) above, display the pyrochlore crystal structure. Pyrochlore structure oxides are represented by the general formula $A_2B_2O_6O'$ wherein A and B are metal cations. A detailed description of their crystallographic structure may be found in *Structural Inorganic Chemistry*, Fourth Edition by A. F. Wells, Clarendon Press, Oxford, 1975. Briefly, oxides of this type display a face-centered cubic structure having a unit cell dimension of about 10Å. The B cations are octahedrally coordinated by oxygen anions (O). The structural framework is formed by a three dimensional array of these corner shared octahedra, each sharing corners with six others. This framework has the composition $B_2O_6$. As Wells describes, this framework of octahedra is "based on the diamond net, having large holes which contain the O' and two A atoms, which themselves form a cuprite-like net $A_2O'$ interpenetrating the octahedral framework". The octahedra are actually arranged in tetrahedral clusters. These clusters of octahedra are then tetrahedrally arranged so as to form the large holes in the structure described by Wells. Each of these large holes may also be defined by four tetrahedrally arranged puckered, hexagonal rings which are formed by the corner shared octahedra. The A cations reside in the center of these puckered hexagonal rings and are coordinated by the six O anions which define the rings plus two more O′ cations at a slightly different distance. These O′ anions reside at the center of the large holes in the octahedral framework. It is the O′ anions which may be partially or totally absent, leading to the general pyrochlore oxide formula $A_2B_2O_{7-y}$ where $0<y<1$. Thus, the compounds made by the method of the present invention are referred to as pyrochlore compounds, albeit they are not stoichiometric pyrochlores, but rather are lead-rich and/or bismuth-rich compounds of the formulas as above.

It has been discovered that the pyrochlore compounds made by the method of the present invention exhibit an expanded lattice, believed to be a result of the increased amount of lead or bismuth in the crystal structure. Although merely a hypothesis at the present time, it is believed that there may exist a direct correlation between the extent of expansion of the lattice and the amount of excess lead or bismuth in the crystalline structure. Thus, it is believed that all things otherwise being equal, the greater the lattice parameter, the greater the amount of lead or bismuth and therefore the larger the variable x in the formula representing the compounds of the present invention. This hypothesis is supported by the fact that all compounds made by the method of the present invention, which have been prepared and lattice parameters determined, do indeed exhibit expanded lattices.

In general terms, the method of the present invention involves reacting A and B cations to yield a pyrochlore oxide by precipitation of A and B cations from an aqueous solution source of these cations in a liquid alkaline medium in the presence of an oxygen source at a temperature below about 200° C. for a sufficient time for reaction to occur. The synthesis occurs entirely in a solution medium where the reaction kinetics are quite favorable and not so restrictive as is found in solid state reactions notwithstanding the low reaction temperature employed in the present method. These conditions result in the formation of product in high surface area form (60–200 m$^2$/g). High surface area is particularly advantageous for materials used in a catalytic or electrocatalytic application since the concentration of available catalytically active sites is maximized.

The aqueous solution source of reactant (A and B) cations is meant by definition to include any aqueous solution which will dissolve ionic A and B cations. This metal cation containing solution may be prepared using A source materials which include lead nitrate, lead oxide, lead chloride, lead acetate, lead carbonate, lead citrate, lead oxalate, bismuth nitrate, bismuth oxide, bismuth chloride, bismuth oxalate and bismuth oxychloride as well as mixtures thereof. Desirably, the A source material used in preparing the aqueous solution source of A and B cations is either a lead source material or a bismuth source material, although, as mentioned, mixtures of these may be used. Among the mentioned A source materials, preferred are lead and bismuth nitrates. The B source materials used in preparing the aqueous solution source of A and B cations include ruthenium chloride, ruthenium nitrate, ruthenium nitrosyl nitrite, iridium chloride, iridium hydroxide and iridium oxalic acid as well as mixtures thereof. Desirably, the B source material is either a ruthenium source or an iridium source, although mixtures thereof may be employed. The preferred B source materials include ruthenium nitrate and iridium chloride.

The aqueous solution source of A and B cations is prepared by dissolving appropriate amounts of A source material and B source material in aqueous solvent. In some cases water is adequate for this dissolution. When necessary, the A and B source materials may be dissolved in aqueous acid solutions, the acid solutions being just strong enough to cause the A and B source materials to dissolve. Acids such as nitric or hydrochloric may be used but nitric acid is preferred.

The A source material and B source material are dissolved in relative amounts so as to achieve, in general, an initial reactant A to B ion ratio of at least about 1.0:1.0. Desirably, this ratio is within the range of about 1.05:1.0 to about 10.0:1.0. In the preferred embodiments the A to B ion ratio is in the range of about 1.2:1.0 to about 5.0:1.0. As a practical matter, the reactants may be used in an A to B ion ratio appreciably higher than the ratio of A to B in the final pyrochlore product.

Preparation of the aqueous solution source of A and B cations in the manner just described assures atomic scale mixing of these cations and thereby provides favorable kinetics for the low temperature, solution medium synthesis that follows.

The liquid alkaline medium is meant by definition to include any liquid alkaline medium which will promote reaction between the A ions and B ions from the mentioned aqueous solution source of A and B cations and will effect the precipitation of the desired pyrochlore structure. The liquid alkaline medium may be any which satisfies this definition and includes aqueous basic solutions of alkali metal hydroxides. Thus, the liquid alkaline medium may desirably be an aqueous basic solution containing a base selected from the group consisting of sodium hydroxide, rubidium hydroxide, cesium hydroxide, potassium hydroxide and mixtures thereof. Desirably, sufficient base is included so as to render a liquid alkaline medium having a pH of at least about 13.5. Preferably, sufficient base is employed so as to produce a liquid alkaline medium having a pH of between about 14 and 15.5. Exact amounts of base material need not be specified since pH determination is within the purview of the artisan.

It is also found to be helpful, although not necessary, to saturate the alkaline reaction medium with respect to one or more of the reactant cations (and especially with respect to the most alkali soluble cation reactant) prior to combination of the aqueous solution source of A and B cations with the alkaline reaction medium. This may be done so as to avoid large discrepancies between cation ratios in the reacted product and in the initial reactant mixture due to possible solubility in the alkaline reaction medium of one or more of the reactant cations.

The alkaline medium acts solely as a reaction medium and not as a constituent in the reaction. This is supported by the fact that the pyrochlores made by the method of this invention show less than 0.02% (by weight) alkali metal cation as measured by atomic absorption.

The oxygen source is meant to include by definition any source which will provide the oxygen needed to form the pyrochlore compound. The oxygen source may be any of the A source material, the M source material, the alkaline liquid medium or combinations thereof. Alternatively or additionally, the oxygen source may be or include independent oxygen contributing material, e.g. bubbled oxygen or oxygen-containing salts or other additives. In any event, an essential aspect of the present invention compound preparation is the inclusion of adequate oxygen to permit the formation of the pyrochlore structure.

No criticality exists as to whether the aqueous solution source of A and B cations is added to the alkaline medium or whether the alkaline medium is added to the aqueous solution source of reactant cations. However, the former is usually practiced to insure that all of the cations see an excess of alkaline medium. In general, at least about 1.0 liter of liquid alkaline medium is used per sum total mole of metal cation reactant. As mentioned, the reaction may be carried out at temperatures below about 200° C. Desirably, the reaction temperature is within the range of about 10° to about 100° C. Preferably, the reaction is carried out at temperatures within the range of about 50° to about 80° C.

During the reaction period the alkaline medium may be replaced with fresh alkaline medium although this is not necessary for successful practice of the invention.

The reaction is carried out for a time sufficient for reaction to occur. With many reactant combinations, at least a partial reaction occurs almost instantly. In any event, the length of time over which the reaction should be allowed to proceed is a matter of choice. Within limits, however, the longer the reaction time, the greater the extent of reaction. As a practical matter, a significant amount of reaction product is obtained by reacting for about one day, and generally a reaction time of about 3 to about 7 days is advantageous.

After the reaction is completed, the reaction product may be separated by known separation means. These separation techniques include filtration and centrifugation. Various post treatments may be employed as desired. These might include heat treatments to improve the crystallinity of the product and/or washing in various media in order to leach out any unreacted metal species. The reaction product includes one or more of the pyrochlore compounds of formula (1) above. When preferred amounts of reactants are employed, compounds of formula (1) may be obtained wherein $0 < x \leq 1.0$. Thus, among the compounds obtained are:

$$Pb_2[Ru_{2-x}Pb_x]O_{7-y} \quad (2)$$

$$Pb_2[Ir_{2-x}Pb_x]O_{7-y} \quad (3)$$

$$PbBi[Ru_{2-x}Pb_x]O_{7-y} \quad (4)$$

$$PbBi[Ir_{2-x}Pb_x]O_{7-y} \quad (5)$$

$$Pb_aBi_b[Ru_{2-x}Pb_x]O_{7-y} \quad (6)$$

$$Pb_2[Ru_{2-x}(Pb_cBi_d)_x]O_{7-y} \quad (7)$$

and the like, wherein x and y are as defined, and wherein $a+b=2$ and $c+d=x$. Also, included are the bismuth-rich counterparts to the foregoing and other variations within the scope of formula (1) which should now be apparent to the artisan. As mentioned, the above pyrochlores produced by the method of the present invention have an expanded lattice and exhibit a high surface area. Further, these compounds display high electronic conductivity, thus making them particularly useful for electrode applications, e.g. as oxygen electrodes.

BRIEF DESCRIPTION OF THE DRAWINGS

FIG. 5 illustrates oxygen reduction Voltage vs. Current Density curves for $Bi_2[Ru_{2-x}Bi_x]O_{7-y}$ prepared in accordance with Example 5 and for 10% platinum on carbon and for $RuO_2$;

FIG. 6 illustrates oxygen evolution Voltage vs. Current Density curves for $Bi_2[Ru_{2-x}Bi_x]O_{7-y}$ prepared in accordance with Example 5 and for platinum black and for $RuO_2$;

DETAILED DESCRIPTION OF THE DRAWINGS, AND THE EXAMPLES

Figure 1:
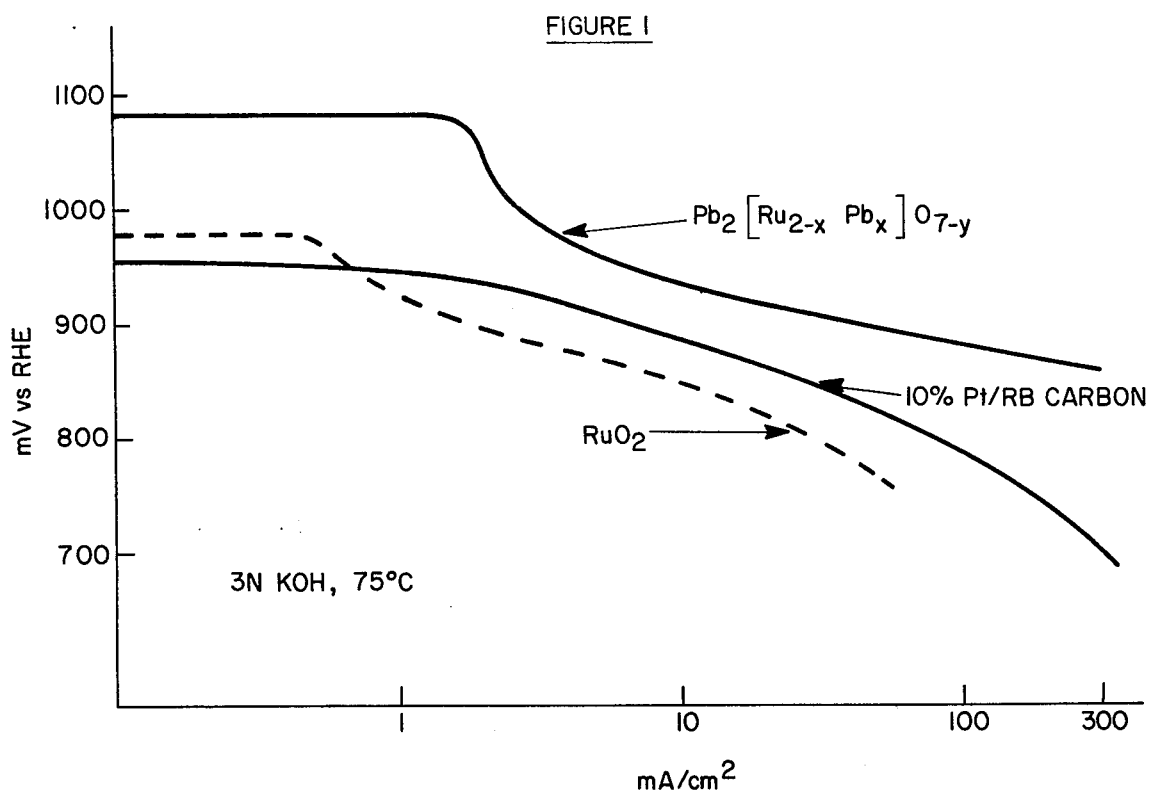
FIG. 1 illustrates oxygen reduction Voltage vs. Current Density curves for $Pb_2[Ru_{2-x}Pb_x]O_{7-y}$ prepared in accordance with Example 1 and for 10% platinum on carbon and and for $RuO_2$.

The present invention will be more fully appreciated in view of the following examples. However, these examples are presented for illustrative purposes, and the present invention should not be construed to be limited thereto:

Example 1

A lead-rich pyrochlore, e.g. $Pb_2[Ru_{2-x}Pb_x]O_{7-y}$, is prepared as follows:

$Pb(NO_3)$ and $Ru(NO_3)_3$ are combined in aqueous solution in an approximately 1.5:1.0 molar ratio of lead to ruthenium, that is, about 4.96 grams of $Pb(NO_3)_2$ and about 2.84 grams of $Ru(NO_3)_3$ (in aqueous solution) are added to 250 ml of distilled water. This solution, after being stirred, is then added, with stirring to 600 ml of 3 N potassium hydroxide and heated to 75° C. Precipitation of a solid occurs immediately. The reaction is carried out, with stirring, for approximately 110 hours with seven interruptions for replacement of the alkaline medium with fresh alkaline medium. The solid is then separated by vacuum filtration, washed in distilled water, and dried at 100° C. X-ray diffraction shows that the reacted product is a crystalline material exhibiting the pyrochlore crystal structure. The Miller indices and interplanar spacings for the X-ray diffraction patterns of the lead-rich pyrochlore $Pb_2[Ru_{2-x}Pb_x]O_{7-y}$ and for $Pb_2Ru_2O_{7-y}$ are shown in Tables I and II respectively. Comparison with the X-ray diffraction pattern of the previously known material $Pb_2Ru_2O_{7-y}$ (given in Table II) shows that the compound of the present example has a crystal lattice that is expanded relative to $Pb_2Ru_2O_{7-y}$ and, thus, is a significantly different material. The surface area, measured by the BET $N_2$ absorption method, is 86 m²/g.

After a 2-hour firing at 400° C. of the reacted product, X-ray diffraction shows that a second phase of $RuO_2$ has crystallized and is admixed with the pyrochlore phase. The pyrochlore phase remains unchanged by this heat treatment. The lead to ruthenium ratio, as determined experimentally by X-ray fluorescence, is 1.05 ± 0.5:1.0. Since the pyrochlore phase with the expanded lattice (relative to $Pb_2Ru_2O_{7-y}$) is admixed with an impurity phase of $RuO_2$, the lead to ruthenium ratio in the expanded pyrochlore must be significantly greater than 1.0:1.0 and is therefore properly referred to as a lead-rich pyrochlore, e.g. $Pb_2[Ru_{2-x}Pb_x]O_{7-y}$.

Example 2

To illustrate the utility of the compound which is obtained by the method of Example 1, electrocatalytic performance curves are obtained in 3N KOH at 75° C. In these tests, the material is fabricated into test electrodes consisting of the catalyst, a binder, a wetproofing agent and a support. Teflon serves as both a binder and wetproofing agent for all the electrodes tested. Gold expanded metal screen is used as the support.

Electrodes are fabricated by mixing a weighed amount of catalyst with a few drops of water, adding a measured volume of Teflon 42 suspension, and mixing vigorously to precipitate the Teflon. The gummy product is then spread on weighed gold Exmet screen and is pressed dry between filter paper. The electrode is then cold pressed for 0.5 min. at 200 psi, is allowed to air dry for 30 min. and is then hot pressed in an inert atmosphere at 325° C., 500 psi for 0.5 min. After cooling, the electrode is weighed to determine its loading and then placed in the electrochemical cell for testing.

The electrochemical half-cell used for testing is of the interface maintaining type and consists of a jacketed liquid phase cell compartment. The liquid side contains the platinum wire counter electrode, a saturated calomel reference electrode (in contact by Lugin capillary), and magnetic stirrer. The gas side contains the gas (oxygen) inlet and outlet and a stopcock to drain off any condensate. The working electrode is held in place (between the two compartments) between two Teflon discs with a gold current collector pressing against it.

The cell is connected to a Princeton Applied Research Model 173 potentiostat with a programmer and logarithmic current converter. Constant rate potential sweep measurements are conducted. Outputs of potential and log of current are recorded on an x-y plotter, and the resulting potential vs. log current density plot, referred to as a performance curve, is used to evaluate the electrode activity.

FIG. 1 shows performance curves for the electrocatalytic reduction of oxygen in 3N KOH at 75° C. using the lead-rich pyrochlore of Example 1 and using platinum supported (10% by weight) on active carbon. The platinum on carbon electrode is typical of conventionally used supported noble metal electrocatalysts. The results shown in the Voltage-Current Density plot of FIG. 1 establish that the lead-rich pyrochlore compound of Example 1 has oxygen-electro-reduction capability superior to a conventional supported platinum electrocatalyst in the tested environment. Also included in FIG. 1 is the performance curve for pure $RuO_2$ which has heretofore been recognized as an oxygen electrocatalyst. A comparison of the curves in FIG. 1 will show that the favorable electrochemical activity which is obtained with the electrode fabricated from the material of Example 1 is not due to the presence of an impurity phase of $RuO_2$.

Figure 2:
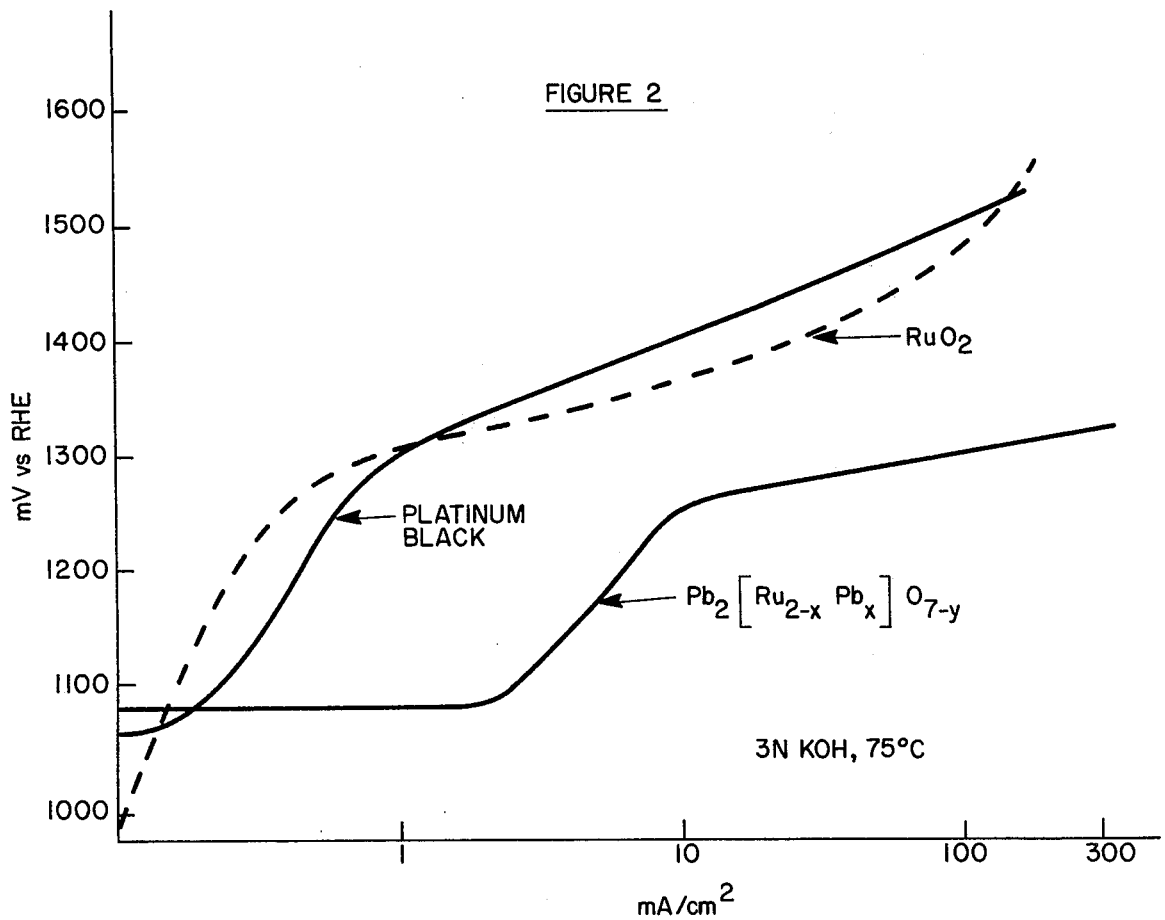
FIG. 2 illustrates oxygen evolution Voltage vs. Current Density curves for $Pb_2[Ru_{2-x}Pb_x]O_{7-y}$ prepared in accordance with Example 1 and for platinum black and for $RuO_2$.

FIG. 2 shows a performance curve for the electrocatalytic evolution of oxygen from 3N KOH at 75° C. using the electrode fabricated from the material of Example 1. Also included for comparison are oxygen evolution performance curves for $RuO_2$ and platinum black. It is evident that the oxygen over-potential (anodic polarization) at any current density is much greater for platinum or $RuO_2$ than it is for the lead-rich pyrochlore, demonstrating that the used lead-rich pyrochlore compound prepared by the method of the present invention remains a superior electrocatalyst.

Example 3

A lead-rich pyrochlore, e.g. $Pb_2[Ru_{2-x}Pb_x]O_{7-y}$ is prepared as follows:

$Pb(NO_3)_2$ and $Ru(NO_3)_3$ are combined in aqueous solution in an approximately 2:1 molar ratio of lead to ruthenium. That is, about 32.79 grams of $Pb(NO_3)_2$ and about 14.21 grams of $Ru(NO_3)_3$ (in aqueous solution) are added to 200 ml of distilled water. This solution, after being stirred, is then added, with stirring, to a preheated (75° C.) solution of 12N potassium hydroxide which is approximately 0.04 molar in lead. The reaction is carried out with stirring and with oxygen being bubbled through the solution, for approximately 150 hours. The solid is then separated by vacuum filtration, washed in distilled water, and dried at 100° C. X-ray diffraction shows that the reacted product is a crystalline material exhibiting the pyrochlore crystal structure. The measured lattice parameter of this material is approximately 10.411Å and demonstrates that the lattice is clearly expanded relative to $Pb_2Ru_2O_{7-y}$ which has a lattice parameter of 10.253Å. The surface area, measured by the BET $N_2$ absorption method, is 64 $m^2/g$.

After a 2-hour firing at 400° C. of the reacted product, X-ray diffraction shows that no second phases have crystallized. Thus, the pyrochlore is not admixed with any impurity phase. The pyrochlore phase remains unchanged by the heat treatment. The lead to ruthenium ratio, as determined experimentally by X-ray fluorescence, is 1.55±.05:1.0. The formula for this pyrochlore may therefore be expressed as $Pb_2[Ru_{1.57}Pb_{0.43}]O_{7-y}$.

Example 4

Figure 3:
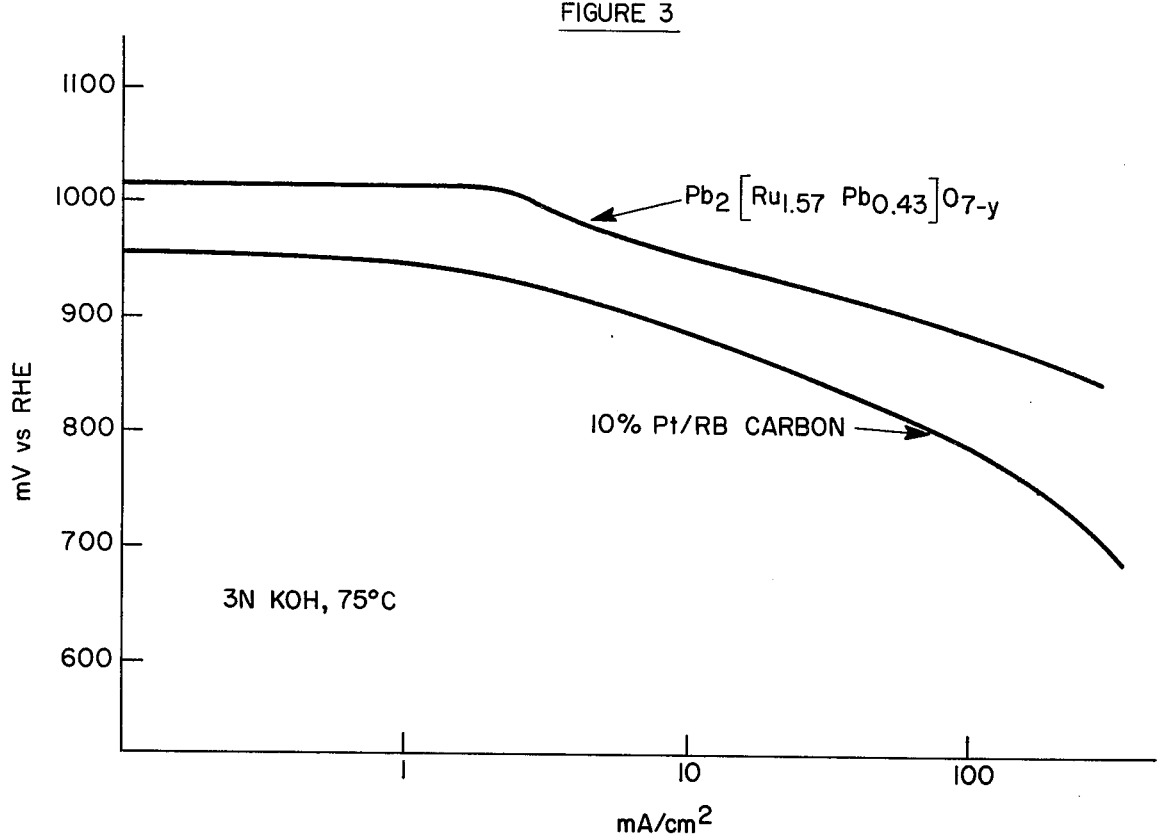
FIG. 3 illustrates oxygen reduction Voltage vs. Current Density curves for $Pb_2[Ru_{1.57}Pb_{0.43}]O_{7-y}$ prepared in accordance with Example 3 and for 10% platinum on carbon.

To illustrate the utility of the compound prepared in Example 3, performance curves for the electrocatalytic reduction of oxygen at 75° C. in 3N KOH are obtained using the lead-rich pyrochlore of Example 3 and using platinum supported (10% by weight) on active carbon. The platinum on carbon electrode is typical of conventionally used supported noble metal electrocatalysts. The results are shown on the Voltage-Current Density Plot of FIG. 3 and establish that the pure lead-rich compound made by the method of the present invention has oxygen-reduction capability superior to a conventional supported platinum electrocatalyst in the tested environment.

Figure 4:
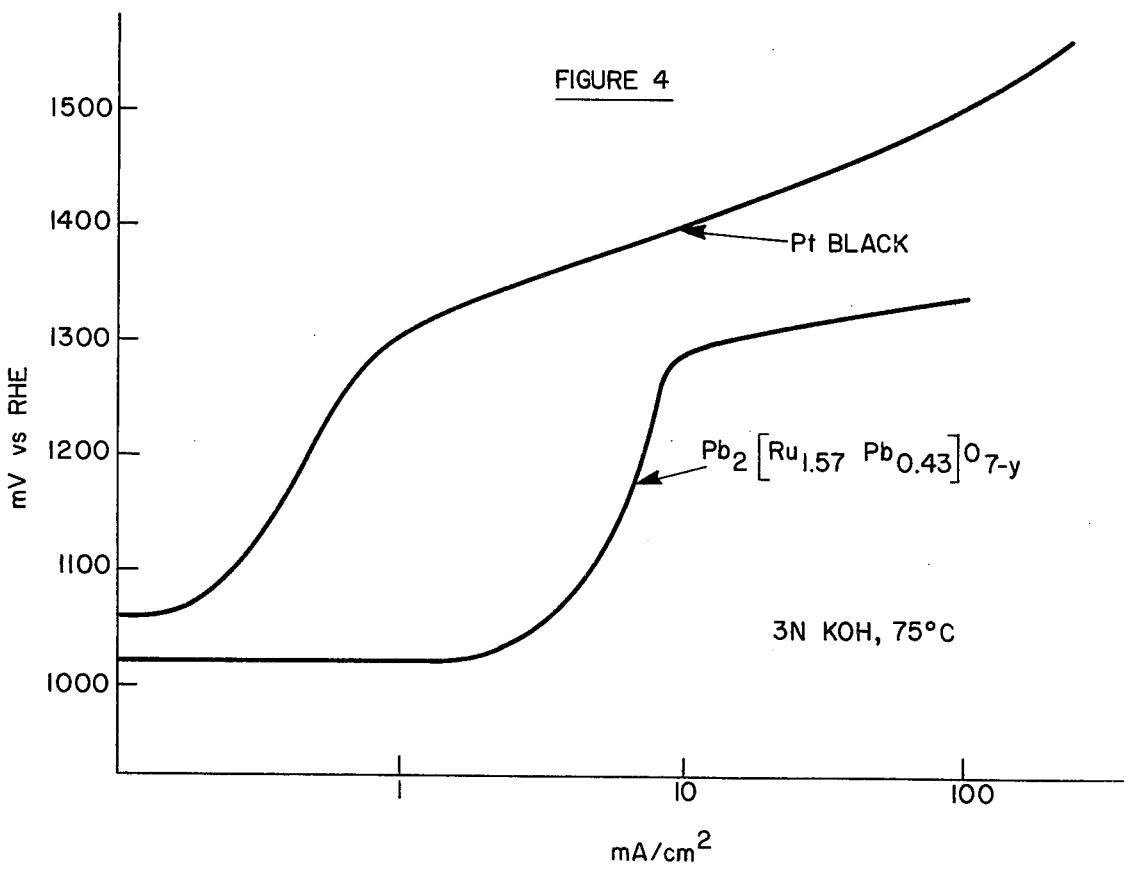
FIG. 4 illustrates oxygen evolution Voltage vs. Current Density curves for $Pb_2[Ru_{1.57}Pb_{0.43}]O_{7-y}$ prepared in accordance with Example 3 and for platinum black.

FIG. 4 shows a performance curve for the electrocatalytic evolution of oxygen from 3N KOH at 75° C. using the electrode fabricated from the material of Example 3. Also included for comparison is the oxygen evolution performance curve for platinum black. It is evident that the oxygen over-potential (anodic polarization) at any current density is much greater for platinum black, demonstrating that the used lead-rich pyrochlore compound prepared by the method of the present invention remains a superior electrocatalyst.

Example 5

A bismuth-rich pyrochlore, e.g. $Bi_2[Ru_{2-x}Bi_x]O_{7-y}$, of the method of the present invention is prepared as follows:

$Bi(NO_3)_3 \cdot 5H_2O$ and $Ru(NO_3)_3$ are combined in aqueous solution in an approximately 1.0:1.0 molar ratio of bismuth to ruthenium. That is, about 2.425 grams of $Bi(NO_3)_3 \cdot 5H_2O$ and about 1.435 grams of $Ru(NO_3)_3$ (in aqueous solution) are added to 100 ml of water and 50 ml of concentrated nitric acid to obtain an equimolar bismuth-ruthenium aqueous solution. This solution is then added, with stirring, to 600 ml of 9N KOH which is heated to approximately 75° C. Precipitation of a solid occurs immediately. The reaction is carried out, with stirring, for approximately 16 hours in this medium. The solid is then separated by vacuum filtration and reacted for another 16 hours in 600 ml of approximately 6N KOH at 75° C. The solid is then again separated by vacuum filtration and reacted for an additional 65 hours in 600 ml of 3N KOH at 85° C. The reacted product after separation by filtration is washed with distilled water and dried. X-ray diffraction shows that the reacted product is a crystalline material exhibiting the pyrochlore crystal structure. The indices and interplanar spacings for the X-ray diffraction reflections for this compound are given in Table III below. Comparison with the X-ray diffraction pattern of the previously known material $Bi_2Ru_2O_{7-y}$ (given in Table IV) shows that the compound of the present example has a crystal lattice that is expanded relative to $Bi_2Ru_2O_{7-y}$ and, thus, is a significantly different and new material. The surface area, measured by the BET $N_2$ absorption method, is 178 $m^2/g$.

After a 2-hour firing at 400° C. of the reacted product, X-ray diffraction shows that a second phase of $RuO_2$ has crystallized and is admixed with the pyrochlore phase. The pyrochlore phase remains unchanged by this heat treatment. The bismuth to ruthenium ratio, as determined experimentally by X-ray fluorescence, is 1.07 ± 0.5:1.0. Since the pyrochlore phase with the expanded lattice (relative to $Bi_2Ru_2O_{7-y}$) is admixed with an impurity phase of $RuO_2$, the bismuth to ruthenium ratio in the expanded pyrochlore must be significantly greater than 1.0:1.0 and is therefore properly referred to as a bismuth-rich pyrochlore, e.g. $Bi_2[Ru_{2-x}Bi_x]O_{7-y}$.

Example 6

To illustrate the utility of the compound which is obtained by the method of Example 5, electrocatalytic performance curves are obtained in 3N KOH at 75° C.

FIG. 5 shows performance curves for the electrocatalytic reduction of oxygen in 3N KOH at 75° C. using the bismuth-rich pyrochlore of Example 5 and using platinum supported (10% by weight) on active carbon. The platinum on carbon electrode is typical of conventionally used supported noble metal electrocatalysts. The results shown in the Voltage-Current Density plot of FIG. 5 establish that the bismuth-rich pyrochlore compound of Example 5 has oxygen electro-reduction capability superior to a conventional supported platinum electrocatalyst in the tested environment. Also included in FIG. 5 is the performance curve for pure $RuO_2$ which has heretofore been recognized as an oxygen electrocatalyst. A comparison of the curves in FIG. 5 will show that the favorable electrochemical activity which is obtained with the electrode fabricated from the material of Example 5 is not due to the presence of an impurity phase of $RuO_2$.

FIG. 6 shows a performance curve for the electrocatalytic evolution of oxygen from 3N KOH at 75° C. using the electrode fabricated from the material of Example 5. Also included for comparison are oxygen evolution performance curves for $RuO_2$ and platinum black. It is evident that the oxygen over-potential (anodic polarization) at any current density is much greater for platinum or $RuO_2$ than it is for the bismuth-rich pyrochlore, demonstrating that the used bismuth-rich pyrochlore compound of the present invention remains a superior electrocatalyst.

Example 7

A bismuth-rich pyrochlore, e.g. $Bi_2[Ru_{2-x}Bi_x]O_{7-y}$, of the method of the present invention, is prepared as follows:

$Bi(NO_3) \cdot 5H_2O$ and $Ru(NO_3)_3$ are combined in aqueous solution in an approximately 1.5:1.0 molar ratio of bismuth to ruthenium. That is, about 3.60 grams of $Bi(NO_3) \cdot 5H_2O$ and about 2.12 grams of $Ru(NO_3)_3$ (in aqueous solution) are added to 75 ml of distilled water and 15 ml of concentrated nitric acid to obtain a bismuth-ruthenium aqueous solution. This solution is then added, with stirring, to 150 ml of 12N KOH at room temperature. Precipitation of a solid occurs immediately. The solution is heated to 90° C. and the reaction is carried out, with stirring and with oxygen being bubbled through the solution, for approximately 20 hours. The solid is then separated by vacuum filtration, washed in distilled water, and dried at 100° C. The measured lattice parameter of this material is approximately 10.465Å and demonstrates that the lattice is clearly expanded relative to $Bi_2Ru_2O_{7-y}$ which has a lattice parameter of 10.299Å. The surface area, measured by the BET $N_2$ absorption method, is 136 $m^2/g$.

After a 2-hour firing at 400° C. of the reacted product, X-ray diffraction shows that no second phases have crystallized. Thus, the pyrochlore is not admixed with any impurity phase. The pyrochlore phase remains unchanged by the heat treatment. The bismuth to ruthenium ratio, as determined experimentally by X-ray fluorescence, is 1.78:1.0. The formula for this pyrochlore may therefore be expressed as $Pb_2[Ru_{1.44}Bi_{.56}]O_{7-y}$. The fact that the bismuth to ruthenium ratio in the reacted product pyrochlore is higher than in the initial reactant mixture can be explained by the solubility of ruthenium in the strongly alkaline reaction medium. This is confirmed by the presence of ruthenium in solution in the filtrate that is obtained when the pyrochlore product is separated from the reaction medium.

Example 8

A lead-rich pyrochlore, e.g. $Pb_2[Ir_{2-x}Pb_x]O_{7-y}$, is prepared as follows:

$Pb(NO_3)_2$ and $IrCl_3$ are combined in aqueous solution in an approximately 3:2 molar ratio. That is, about 2.25 grams of $Pb(NO_3)_2$ and about 1.35 grams of $IrCl_3$ (in aqueous solution) are added to 250 ml of distilled water. This solution after being stirred, is then added, with stirring, to a preheated (75° C.) solution of 3N potassium hydroxide. The reaction is carried out, with stirring, for approximately 72 hours at 75° C. with one replacement of the alkaline medium with fresh alkaline medium, and approximately 65 hours at 95° C. The product solid is then separated by vacuum filtration, washed in distilled water, and dried at 100° C. X-ray diffraction shows that the reacted product is a poorly crystallized pyrochlore type material. The material is subsequently heat treated for approximately 16 hours at 300° C., 20 hours at 400° C., and 5 hours at 500° C. X-ray diffraction of this heat treated solid shows that the material is a fairly well crystallized pyrochlore compound. The lattice parameter of this material is approximately 10.35Å and demonstrates that the lattice is clearly expanded relative to $Pb_2Ir_2O_{7-y}$ which has a lattice parameter of 10.271Å. Thus, the material synthesized in this example is a lead-rich pyrochlore of the type, $Pb_2[Ir_{2-x}Pb_x]O_{7-y}$. The surface area of the heat treated material, measured by BET $N_2$ absorption, is 7 $m^2/g$.

Example 9

Figure 7:
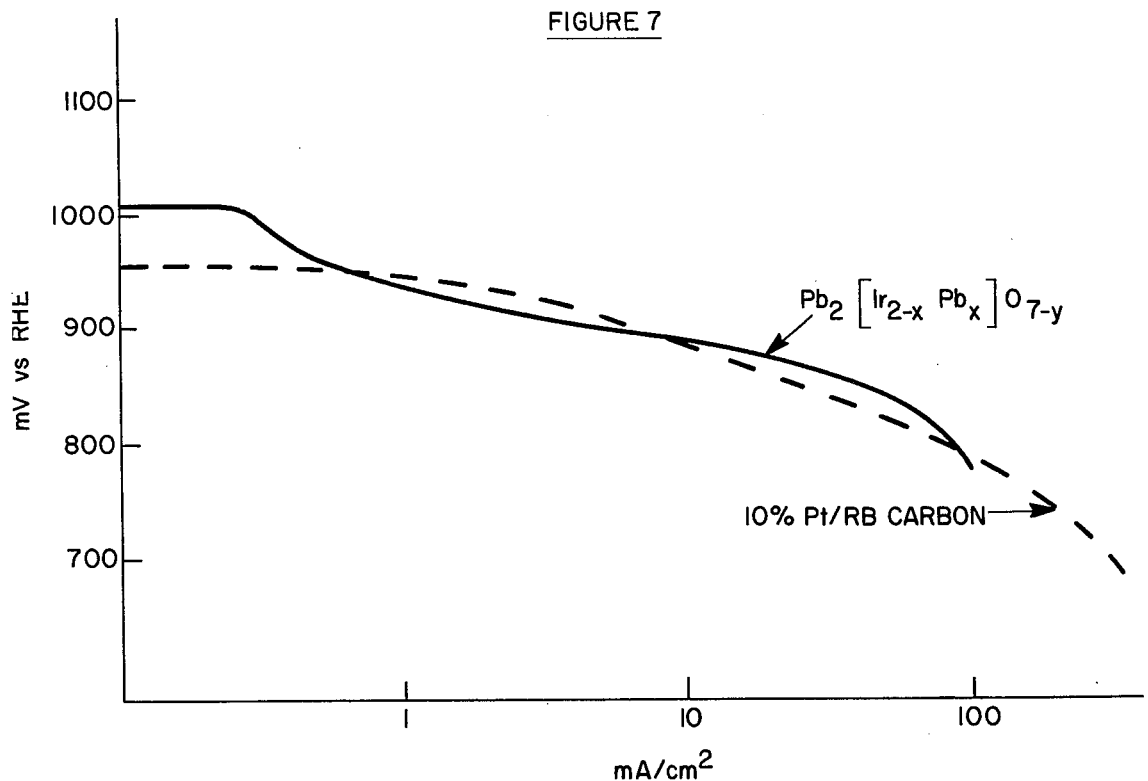
FIG. 7 illustrates oxygen reduction Voltage vs. Current Density curves for $Pb_2[Ir_{2-x}Pb_x]O_{7-y}$ prepared in accordance with Example 8 and for 10% platinum on carbon.

To illustrate the utility of the compound prepared in Example 8, performance curves for the electrocatalytic reduction of oxygen at 75° C. in 3N KOH are obtained using the lead-rich pyrochlore of Example 8 and using platinum supported (10% by weight) on active carbon. The results are shown on the Voltage-Current Density Plot of FIG. 7 and establish that the pure lead-rich iridate pyrochlore made by the method of the present invention has oxygen reduction capability superior to a conventional supported platinum electrocatalyst in the tested environment.

Figure 8:
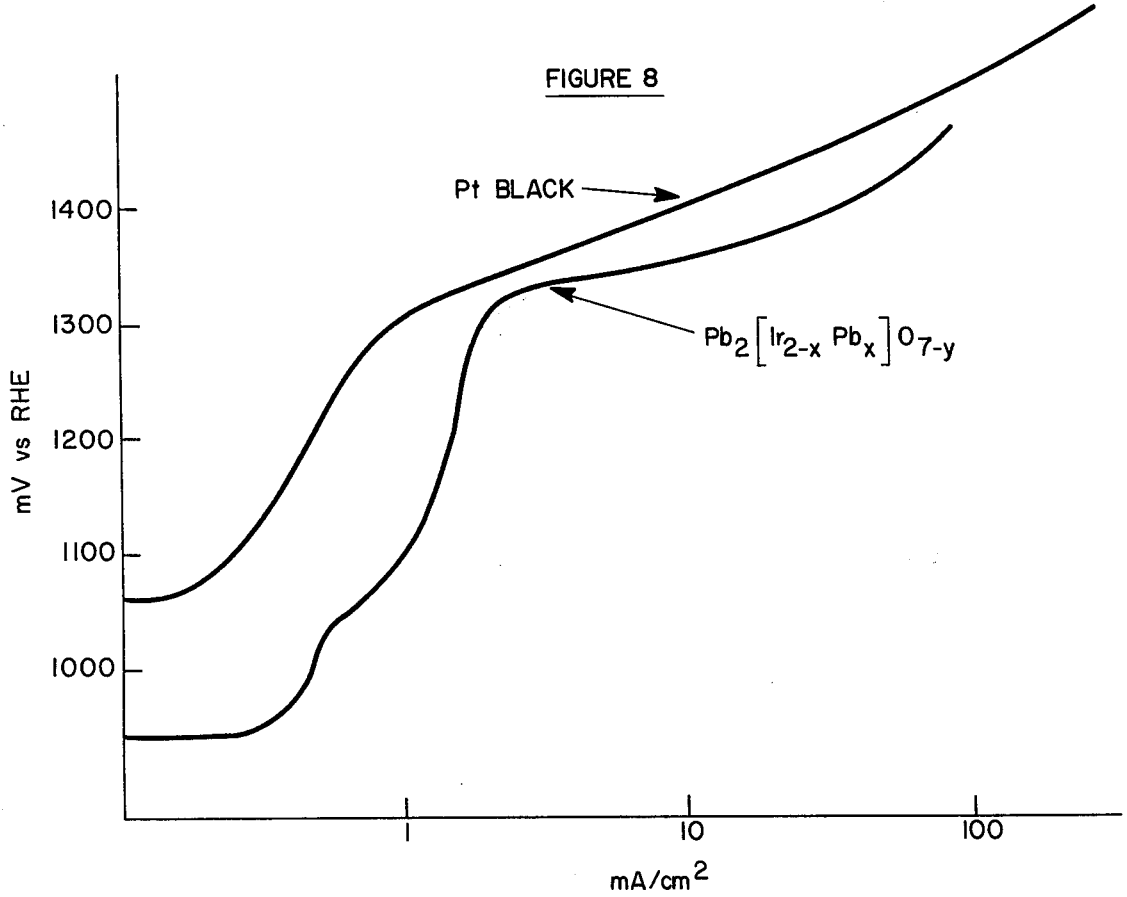
FIG. 8 illustrates oxygen evolution Voltage vs. Current Density curves for $Pb_2[Ir_{2-x}Pb_x]O_{7-y}$ prepared in accordance with Example 8 and for platinum black.

FIG. 8 shows a performance curve for the electrocatalytic evolution of oxygen from 3 N KOH at 75° C. using the electrode fabricated from the material of Example 8. Also included for comparison is an oxygen evolution performance curve for platinum black. It is evident that the oxygen over-potential (anodic polarization) at any current density is greater for platinum black demonstrating that the lead-rich iridate pyrochlore compound prepared by the method of the present invention remains a superior electrocatalyst.

TABLE I
X-RAY DIFFRACTION POWDER PATTERN FOR $Pb_2[Ru_{2-x}Pb_x]O_{7-y}$

| h k l | d (Å) |
|---|---|
| (111) | 5.94 |
| (222) | 2.98 |
| (400) | 2.58 |
| (440) | 1.83 |
| (622) | 1.56 |
| (444) | 1.49 |
| (800) | 1.29 |
| (662) | 1.19 |
| (840) | 1.15 |

TABLE II
X-RAY DIFFRACTION POWDER PATTERN FOR $Pb_2Ru_2O_{7-y}$

| h k l | d (Å) |
|---|---|
| (111) | 5.920 |
| (311) | 3.0914 |
| (222) | 2.960 |
| (400) | 2.563 |
| (331) | 2.352 |
| (333) (511) | 1.973 |
| (440) | 1.813 |
| (531) | 1.733 |
| (622) | 1.546 |
| (444) | 1.480 |
| (553) (731) | 1.335 |
| (800) | 1.282 |
| (733) | 1.253 |
| (662) | 1.176 |
| (840) | 1.146 |

TABLE II-continued
X-RAY DIFFRACTION POWDER PATTERN FOR $Pb_2Ru_2O_{7-y}$

| h k l | d (Å) |
|---|---|
| (844) | 1.046 |

TABLE III
X-RAY DIFFRACTION POWDER PATTERN FOR $Bi_2[Ru_{2-x}Bi_x]O_{7-y}$

| h k l | d (Å) |
|---|---|
| (222) | 3.02 |
| (400) | 2.59 |
| (331) | 2.38 |
| (440) | 1.83 |
| (622) | 1.56 |
| (800) | 1.30 |
| (662) | 1.19 |

TABLE IV
X-RAY DIFFRACTION POWDER PATTERN FOR $Bi_2Ru_2O_{7-y}$

| h k l | d (Å) |
|---|---|
| (111) | 5.946 |
| (311) | 3.105 |
| (222) | 2.973 |
| (400) | 2.575 |
| (331) | 2.363 |
| (333) (511) | 1.982 |
| (440) | 1.821 |
| (531) | 1.741 |
| (622) | 1.553 |
| (444) | 1.487 |
| (553) (731) | 1.341 |
| (800) | 1.287 |
| (733) | 1.258 |
| (662) | 1.181 |

What is claimed is:

1. A method of preparing compounds having the formula:

$$A_2[B_{2-x}A_x]O_{7-y}$$

wherein A is selected from the group consisting of lead, bismuth and mixtures thereof, wherein B is selected from the group consisting of ruthenium, iridium and mixtures thereof, wherein x is a value such that $0 < x \leq 1.0$ and y is a value such that $0 \leq y \leq 1$, comprising:

reacting A cations and B cations from an aqueous solution source of these cations in a liquid alkaline medium having a pH of at least about 13.5 in the presence of an oxygen source at a temperature below about 200° C. for a sufficient time for reaction to occur.

2. The method of claim 1 wherein said aqueous solution source contains A source material selected from the group consisting of lead nitrate, lead oxide, lead chloride, lead acetate, lead carbonate, lead citrate, lead oxalate, bismuth nitrate, bismuth oxide, bismuth chloride, bismuth oxalate, bismuth oxychloride and mixtures thereof and B source material selected from the group consisting of ruthenium chloride, ruthenium nitrate, ruthenium nitrosyl nitrate, iridium chloride, iridium hydroxide and iridium oxalic acid.

3. The method of claim 2 wherein said liquid alkaline medium is an aqueous basic solution of alkali metal hydroxide.

4. The method of claim 3 wherein said aqueous basic solution contains a base selected from the group consisting of sodium hydroxide, rubidium hydroxide, cesium hydroxide, potassium hydroxide and mixtures thereof.

5. The method of claim 4 wherein said reacting is performed within the temperature range of about 10° C. to about 100° C.

6. The method of claim 5 wherein said pH is within the range of about 14 to about 15.5.

7. The method of claim 6 wherein said reacting is performed within the temperature range of about 50° C. to about 80° C.

8. The method of claim 1 wherein A is lead.

9. The method of claim 8 wherein said aqueous solution source contains as A source material lead nitrate and contains B source material selected from the group consisting of ruthenium nitrate and iridium chloride.

10. The method of claim 9 wherein said liquid alkaline medium is an aqueous basic solution of alkali metal hydroxide.

11. The method of claim 10 wherein said aqueous basic solution contains a base selected from the group consisting of sodium hydroxide, rubidium hydroxide, cesium hydroxide, potassium hydroxide and mixtures thereof.

12. The method of claim 11 wherein said reacting is performed within the temperature range of about 10° C. to about 100° C.

13. The method of claim 12 wherein said pH is within the range of about 14 to about 15.5.

14. The method of claim 13, wherein said reacting is performed within the temperature range of about 50° C. to about 80° C.

15. The method of claim 1 wherein A is bismuth.

16. The method of claim 15 wherein said aqueous solution source contains as A source bismuth nitrate and contains B source material selected from the group consisting of ruthenium nitrate and iridium chloride.

17. The method of claim 16 wherein said liquid alkaline medium is an aqueous basic solution of alkali metal hydroxide.

18. The method of claim 17 wherein said aqueous basic solution contains a base selected from the group consisting of sodium hydroxide, rubidium hydroxide, cesium hydroxide, potassium hydroxide and mixtures thereof.

19. The method of claim 18 wherein said reacting is performed within the temperature range of about 10° C. to about 100° C.

20. The method of claim 19 wherein said pH is within the range of about 14 to about 15.5.

21. The method of claim 20 wherein said reacting is performed within the temperature range of about 50° C. to about 80° C.

* * * * *